United States Patent [19]

Chadwick et al.

[11] Patent Number: 4,639,587

[45] Date of Patent: Jan. 27, 1987

[54] AUTOMATIC FOCUSING SYSTEM FOR A MICROSCOPE

[75] Inventors: Curt H. Chadwick, Los Altos; Art M. Shulenberger, Capitola; John S. Taylor, San Jose; Richard R. Simmons, Los Altos, all of Calif.

[73] Assignee: KLA Instruments Corporation, Santa Clara, Calif.

[21] Appl. No.: 693,651

[22] Filed: Jan. 22, 1985

Related U.S. Application Data

[63] Continuation-in-part of Ser. No. 582,584, Feb. 22, 1984.

[51] Int. Cl.⁴ .................................................. G01J 1/20
[52] U.S. Cl. ...................................... 250/201; 250/204
[58] Field of Search .................... 250/201, 204; 356/1, 356/4; 354/403

[56] References Cited

U.S. PATENT DOCUMENTS

4,011,446  3/1977  Swanberg ............................ 250/201
4,255,029  3/1981  Freudenschuss .................... 250/201

Primary Examiner—David C. Nelms
Attorney, Agent, or Firm—Hamrick, Hoffman, Guillot & Kazubowski

[57] ABSTRACT

An automatic microscope focusing system including a light source 44, a dual channel fiber optics bundle 56 and 58, chopper means 54 for alternately admitting light to the channels, a reticle 66 and associated optics to cast alternating images onto the surface of an inspected article W, return masks 82 and 88, and associated detectors 86 and 92 for inspecting the alternating reticle images, and control circuitry 36 and 38 responsive to the detector outputs and operative to drive the system microscope 10 into focus. The preferred embodiment also includes a flipping pupil 60 for accommodating particular microscope objectives.

20 Claims, 14 Drawing Figures

FIG_1

FIG_ 6

FIG_ 7

FIG_ 8

FIG_14

AUTOMATIC FOCUSING SYSTEM FOR A MICROSCOPE

This application is a continuation-in-part of application Ser. No. 582,584, filed Feb. 22, 1984.

BACKGROUND OF THE INVENTION

1. Field of the Invention

This invention relates generally to apparatus for automatically adjusting the focus of an objective lens used to inspect an article and more particularly, to an electro-optical system that utilizes fiber optics bundles, a multi-apertured projection reticle and a pair of multi-apertured return masks and corresponding detectors to derive control signals which are used to vary the physical separation between microscope objectives and an article or object to be inspected so as to bring the microscope into a position of focus relative thereto.

2. Description of the Prior Art

In apparatus for automatically inspecting articles such as photomasks and the like, it is important that means be included to automatically accomplish the focusing lf lenses used in the inspection process. One prior art apparatus providing for the automatic focusing of a lens for photomask inspection relies upon that fact that the magnification of an article viewed through a lens system is a function of the distance of the article from the image plane of the lens. The system relies upon the fact that as the article moves further away from the lens and its ideal focus position, a point in the periphery of the field moves inwardly toward the optical axis of the lens, and similarly, as the object gets closer to the lens a point in the periphery of the field moves outwardly and away from the optical axis. Thus, by focusing a narrow beam of light on a point in the periphery of the field and then detecting the position of this point relative to a known position, the spacing between the objective and the inspected article can be determined. Although this system works well where the surface being inspected is generally smooth, it does not provide acceptable accuracy for multi-level surfaces of the type present on silicon wafers having integrated circuits or the like formed therein.

An automatic lens focusing system designed for inspecting semiconductor wafers and the like is disclosed in the co-pending application of Paul Sandland et al, Ser. No. 582,584, filed Feb. 22, 1984 and assigned to the assignee of the present invention, and of which this application is a continuation-in-part. The description of such system is expressly incorporated herein by reference.

SUMMARY OF THE PRESENT INVENTION

It is an object of the present invention to provide an improved automatic focusing system for use in wafer inspecting devices and the like.

It is another object of the present invention to provide a device of the type described wherein a high level of focusing accuracy is achieved on targets such as patterned silicon wafers with a large degree of local surface relief and reflectivity variations.

Briefly, a preferred embodiment of the present invention includes a light source, a dual channel fiber optics bundle, chopper means for alternately admitting light to the channels, a reticle and associated optics to cast alternating images onto the inspected article, return masks and associated detectors for inspecting the alternating reticle images, and control circuitry responsive to the detector outputs and operative to drive the system microscope into focus. The preferred embodiment also includes a flipping pupil for accommodating particular microscope objectives.

An important advantage of the present invention is that it provides a system which is capable of focusing on patterned silicon wafers with multiple levels and large contrast variations. This is due to the fact that both channels return identical images when they are in focus. When the channels are subtracted from each other, the wafer pattern effects disappear. Accordingly, a particular microscope objective is caused to focus to the average local relief of the surface area being inspected.

These and other objects and advantages of the present invention will no doubt become apparent to those skilled in the art after having read the following detailed description of a preferred embodiment illustrated in the several figures of the drawing.

DETAILED DESCRIPTION OF THE PREFERRED EMBODIMENT

Figure 1:
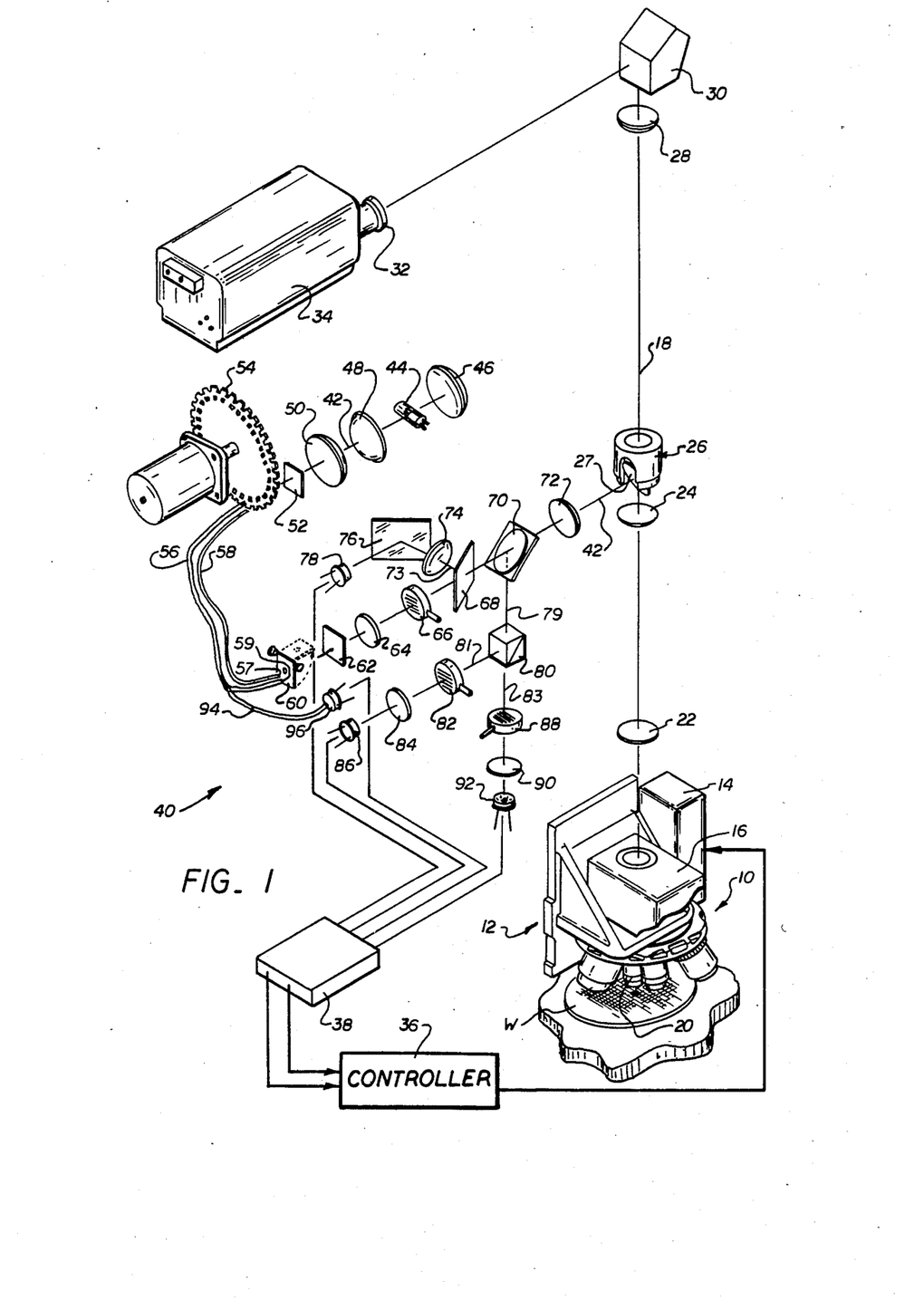
FIG. 1 is an exploded perspective view showing an automatic focusing system in accordance with the present invention.

Referring now to FIG. 1 of the drawing, a microscope turret is shown at 10 carried by a turret mounting and positioning assembly 12 of the type shown and described in the above-identified U.S. patent application of Sandland et al, for positioning a selected microscope objective above the surface of a wafer W to be inspected, such wafer being carried by a moveable stage shown in broken part at 13. Assembly 12 includes a turret drive and positioning mechanism shown generally at 14 and a microscope imaging lens system also shown generally at 16. A system optical axis 18 is defined by one of the microscope objectives 20, the imaging lens 16, field lens 22, a 148 mm lens 24, a dichroic beam splitter shown generally at 26, a 300 mm lens 28, a penta prism 30, and the input lens 32 of a video camera 34. It should be noted that light between the lenses 24 and 28 is collimated. Operation of video camera 34 and penta prism 30 are also described in the above-identified U.S. patent application of Sandland et al. It will be appreciated however, that the present invention could be incorporated into any optical system requiring automatic microscope focusing.

As will be further described below, a controller 36 responds to signals developed by an autofocus preamplifier 38 and provides drive signals for input to the turret drive and positioning mechanism 14.

The auto focus optical system shown generally at 40 includes means forming a first optical path 42 which commences at a quartz halogen lamp 44 and spherical mirror 46 and passes through a collector lens 48, condensor lens 50 and hot mirror 52. Optical axis 42 passes through mirror 52 and is divided by the apertures of a chopper wheel 54 into a pair of initially separated parallel paths, or channels, which are defined by fiber optics bundles 56 (channel A) and 58 (channel B). Light emanating from the distal ends of fiber optics bundles 56 and 58 passes through a flipping pupil 60, through a red filter 62 and 50 mm pupil lens 64, and a multi-apertured projection reticle 66. The first optical axis then continues through a 5% beamsplitter 68, a 50% beamsplitter 70 and an imaging lens 72 before entering the system optical axis 18 at the Dichroic beamsplitter 26.

A portion of the light passing through reticle 66 is diverted by beamsplitter 68 to form a second optical axis 73 passing through a detector imaging lens 74 and a reflector 76 onto a forward photodetector 78.

Beamsplitter 70 diverts light returning from the wafer W and reflected back along the axis 42 through imaging lens 72 onto a third optical axis 79 including another 50% beamsplitter 80, a first return mask 88, a detector lens 90 and an S-CURVE detector 92. Beamsplitter 80 diverts light returning along axis 79 to a fourth optical axis 81 including a second return mask 82, a detector lens 84 and onto a SUM detector 86.

It will be noted that a part of fiber optics bundle 56 is split off at 94 to cast light onto a channel A select detector 96. The outputs of detectors 78, 86, 92 and 96 are all input to preamplifier 38.

As will be further explained in the following, generally speaking the system 40 alternatively projects a pair of axially offset red light images of the projection reticle 66 onto the wafer W being inspected, and the offset images are then returned through the system and along axes 79 and 81 where each is focused through a slotted mask onto a photodetector. The positioning of the slotted image relative to the associated masks is then indicative of the state of focus of the microscope.

Figure 2:
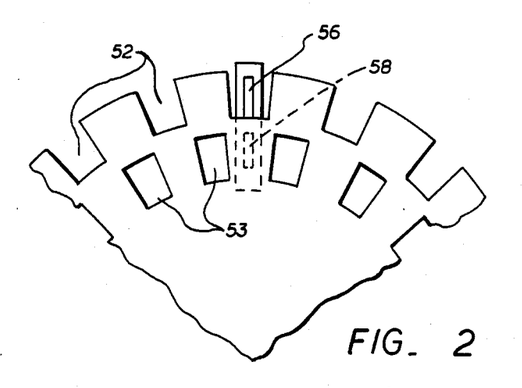
FIG. 2 is a diagram illustrating details of a light chopper wheel and the associated illuminated end of a fiber optics bundle.

As alluded to above, illumination for the subject autofocus system is provided by the a 100 watt quartz halogen lamp 44 and such illumination is collected by a spherical mirror 46 and focused through the mirror 52 and chopper wheel 54 onto the entrance ends of the fiber optics bundles 56 and 58 as illustrated in FIG. 2. The exit ends 57 and 59 of the fiber optics bundles are placed at the conjugate image of the back aperture of the microscope objective (pupil image). This image is formed by placing the exit end of the fiber optics at the focal point of the 50 mm focal length pupil lens 64 so that the light exiting the fiber optics passes through the pupil lens 64 and becomes collimated. It then passes through the projection reticle 66 located at the other focal point of the pupil lens. Reticle 66 also lies at the focal point of the 100 mm auto focus imaging lens 78 which collimates the light passing through the reticle. The autofocus light containing only wavelengths above 650 nm, as a result of passing through the red filter 62, then enters the micro system via a Dichroic mirror 27 forming a part of beam splitter mount 26 and which reflects light longer in wavelength than 650 nm and transmits light with shorter wavelengths. Since the light from the reticle 66 is collimated when it enters the optical path of the microscope proper, in the collimated space between the 148 mm microscope lens 24 and the 300 mm microscope imaging lens 28, the reticle image is focused onto the wafer W when the microscope is in focus.

Figure 3:
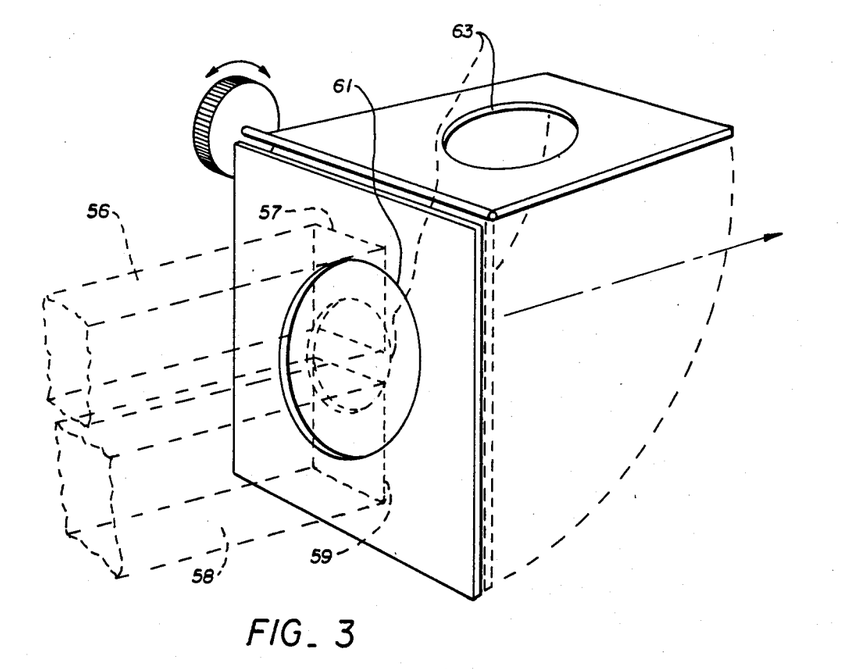
FIG. 3 is a diagram illustrating details of a dual apertured pupil mechanism for use in accordance with the present invention.

As more clearly depicted in FIG. 3, the exit ends 57 and 59 of the fiber optics bundles 56 and 58 are covered by a relatively large fixed aperture 61 which is slightly smaller than the conjugate image of the back apertures of the 5×, 10×, 20× and 50× objectives back apertures. The back aperture of the 100× objective is much smaller than the others so a smaller aperture 63 is flipped into place over the larger aperture when the 100× objective is in use. The size of this aperture is slightly smaller than the conjugate image of the back aperture of the 100× objective. The assembly that flips the smaller aperture in and out of the optical path is called the "flupil" (flipping pupil).

In the preferred embodiment, the chopper wheel 54 (see also FIG. 2) is placed directly in front of the fiber optics bundles and two sets of openings 52 and 53 respectively, serve to alternately uncover each fiber optics channel in succession. The configuration of wheel 54 is such that when rotated at 1800 RPM the light passing through the apertures therein will switch from "channel" to "channel" at a 1600 Hz rate. Furthermore, only one channel will be illuminated at any one time. Thus, only the top half or the bottom half of any objective back aperture is illuminated at any one time. This causes the returning image of the projection reticle 66 associated with each fiber optics channel to move up and down as the microscope objective is moved up and down relative to the wafer W, i.e., as the objective is moved in and out of focus. In other words, when the channel A image is moving up, the channel B image is moving down and vice versa.

As indicated above, 50% of the autofocus red light returning from wafer W is split out of the main beam by the beam splitter 70 which is positioned between the imaging lens 72 and projection reticle 66. This light is then split into two equal beams by splitter 80, with each beam alternately forming an image of the reticle on the return masks 82 and 88.

It will be appreciated that as the microscope objective moves up and down out of focus, each return image moves laterally (relative to the longitudinal axis of each aperture) on each return mask (82 and 88). The light passing through each return mask is focused onto a silicon photodetector (86 and 92) by the detector lens 84 and 90 respectively.

Figure 4:
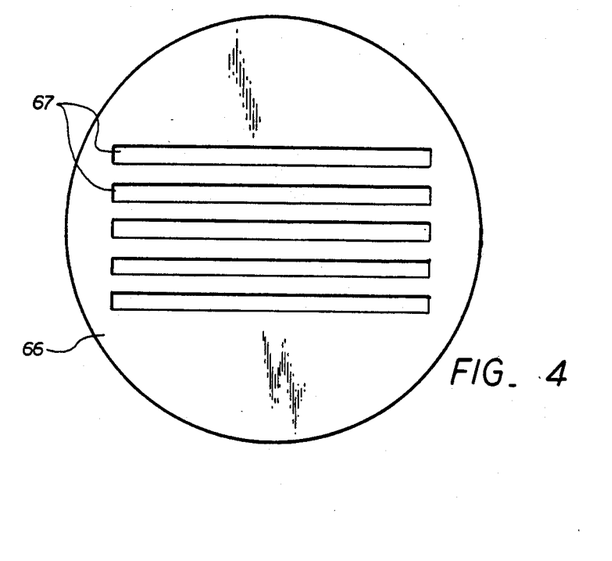
FIG. 4 is a diagram illustrating a projection reticle in accordance with the present invention.

Referring now to FIG. 4, it is shown that the preferred embodiment of projection reticle 66 is comprised of five clear bars 67 on an opaque field. The five bars are imaged onto the wafer over an area the height of which is equal to the width of the field of view of the video camera 34 and the width of which is three times as long. However, it is to be noted that a wide variety of aperture shapes and sizes could also be used.

Figure 5:
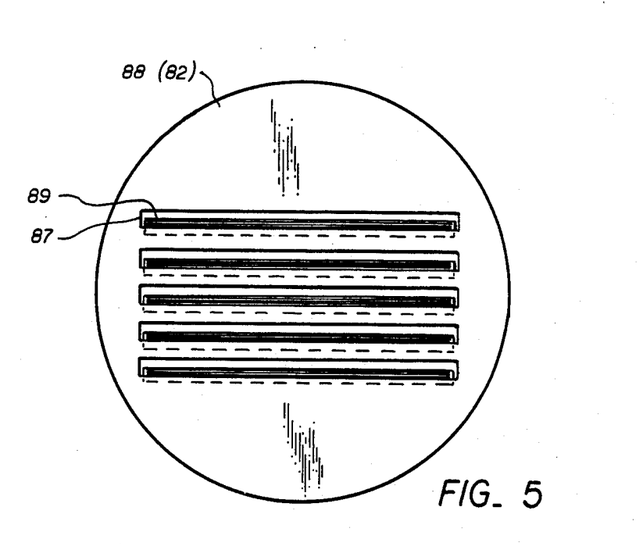
FIG. 5 is a diagram illustrating the alignment of the projection reticle image with the S-CURVE mask when the microscope is in focus.

The return masks 82 and 88 (FIG. 5) are each formed of a similar array of clear bars 87 on an opaque background. When the microscope is in focus, the reticle images from both channels are coincident and aligned with the S-CURVE return mask as shown at 89 in FIG. 5. As the objective moves up out of focus, the reticle image associated with channel A moves up (and that from channel B moves down), thus increasing the light from channel A (and channel B) that passes through the return mask and falls on the S-CURVE detector 92. When the objective moves down, the channel A image moves down (and channel B moves up) decreasing the light that falls on the S-CURVE detector.

Figure 6:
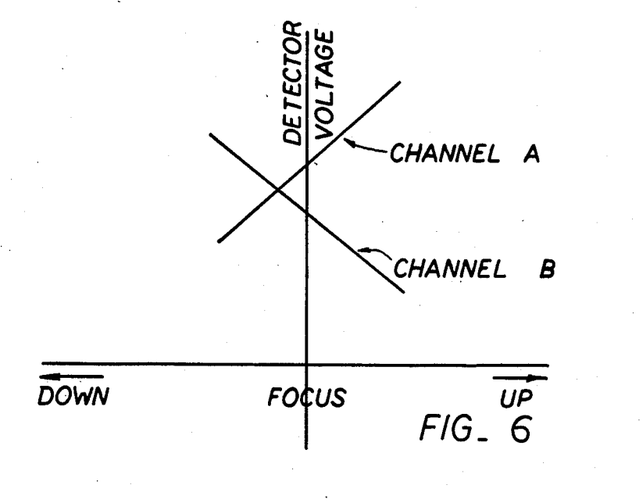
FIGS. 6, 7 and 8 are curves illustrating operation of the present invention.

As will be further described below, the current output of detector 92 is passed through a current voltage amplifier. Thus, the voltage output for the S-CURVE detector/amplifier will vary with focus position approximately as shown in FIG. 6. When the microscope is near focus, the S-CURVE will be reversed for the channel B signal due to the fact that the B image moves in the opposite direction of the A image.

Figure 7:
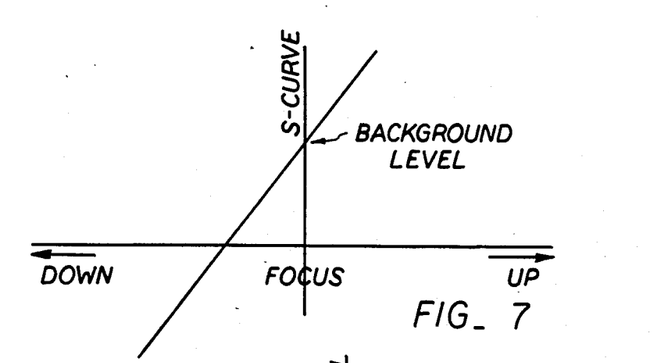

When the output of the detector amplifiers are multiplexed by the chopper wheel 54 and one voltage is subtracted from the other, the result is a curve similar to that shown in FIG. 7. The curve does not pass through zero at focus, due to background light levels that are constant but different for each channel. This focus bias is subtracted out later by the autofocus controller. Note that since both channels return identical images when the microscope is in focus, the return light will be independent of the pattern on the wafer. This is of critical importance as the reticle image returning from the wafer will continue the wafer pattern as well as the reticle patterns.

Figure 8:
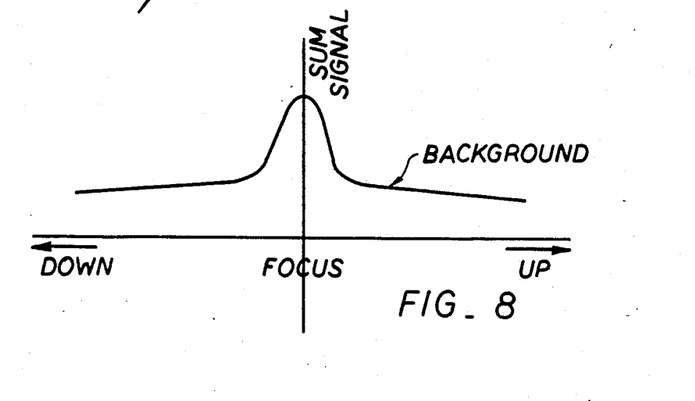

The second return mask 82 is the SUM mask and is identical to the S-CURVE except that it is aligned with the corresponding returning projection reticle images so that the projected bars are centered in the clear slots 87 in the SUM return mask 82. The light from both channels thus behaves the same. They are added together to produce the signal shown in FIG. 8.

In order to avoid having the autofocus projected light intensity affect the S-CURVE and SUM signal levels, and to remove the effects of differences between the efficiencies of the channel A and channel B fiber optics, the forward detector 78 is included in the system. As previously indicated, 5% of the light passing through the projection reticle 66 is split out of the main projected beam by the plate beam splitter (68) and is focused on the detector 78 by a third detector lens 74. The output of detector 78 is converted to a voltage and divided into the voltage outputs of the S-CURVE and SUM detector/amplifiers. The signal from the forward detector 78 is also used to synchronize the multiplexer signals in the autofocus preamplifier.

The fourth detector 96 is included to facilitate synchronization of the system. A few fibers 94 from the channel A fiber optics bundle 56 are split off directly for input to the channel select detector 96. The forward detector 78 registers exactly when either channel is ON, while the channel select detector 96 registers when only channel A is ON. The voltage outputs of the autofocus preamplifier circuit are summarized below.

There is a constant background associated with each of Vsa, Vsb, Vsuma and Vsumb that may be expressed by defining:

$$Vi = Vi' + Vi'', \quad i = sa, sb, suma, sumb \quad (1)$$

where $Vi'$ is the part of $Vi$ that depends on focus position and $Vi''$ is the background signal associated with $Vi$ due to scattered light and deflections from lens surfaces independent of objective focus.

($Vi'$ and $Vi''$ are of the same order of magnitude)

Also letting Fa and Fb represent the forward detection signals for channel A and channel B, then the S-CURVE signal is $$\text{S-CURVE} = \frac{Vsa' + Vsa''}{Fa} - \frac{Vsb' + Vsb''}{Fb} \quad (2)$$

and the SUM signal is given by $$\text{SUM} = \frac{Vsuma' + Vsuma''}{Fa} + \frac{Vsumb' + Vsumb''}{Fb} \quad (3)$$

When the system is in MACRO mode (as explained in the above-referenced Sandland et al application), there is no wafer under the microscope and all that is read by the S-CURVE and SUM detectors is in the background signal. This signal is a function of the objective power but is constant otherwise. Thus, $$\text{S-CURVE(MACRO)} = \frac{Vsa''}{Fa} - \frac{Vsb''}{Fb} \quad (4)$$

and $$\text{SUM(MACRO)} = \frac{Vsuma''}{Fa} + \frac{Vsumb''}{Fb} \quad (5)$$

Substituting equation (40 into equation (2), and equation (5) into equation (3)

$$\text{S-CURVE} = \frac{Vsa'}{Fa} - \frac{Vsb'}{Fb} + (\text{S-CURVE(MACRO)}) \quad (6)$$

and $$\text{SUM} = \frac{Vsuma'}{Fa} + \frac{Vsumb'}{Fb} + (\text{SUM(MACRO)}) \quad (7)$$

The autofocus controller circuit records S-CURVE(MACRO) and SUM(MACRO) for each objective when the system is in MACRO mode and subtracts them from the S-CURVE and SUM outputs respectively, when the system is in focus. This yields $$\frac{Vsa'}{Fa} - \frac{Vsb'}{Fb} = (\text{S-CURVE}) - (\text{S-CURVE(MACRO)}) \quad (8)$$

and $$\frac{Vsuma'}{Fa} + \frac{Vsumb'}{Fb} = \text{SUM} - \text{SUM(MACRO)} \quad (9)$$

The final feedback signal is obtained by dividing equation (8) by equation (9) to obtain a signal compensated for wafer reflectivity variations as well as background signal. Thus, $$(\text{S-CURVE(NORM)}) = \frac{Vsa'}{Fa} - \frac{Vsb'}{Fb} \quad (10)$$

$$= \frac{Vsuma'}{Fa} + \frac{Vsumb'}{Fb}$$

$$= \frac{\text{(S-CURVE)} - \text{(S-CURVE(MACRO))}}{\text{SUM} - \text{SUM(MACRO)}}$$

Figure 9:
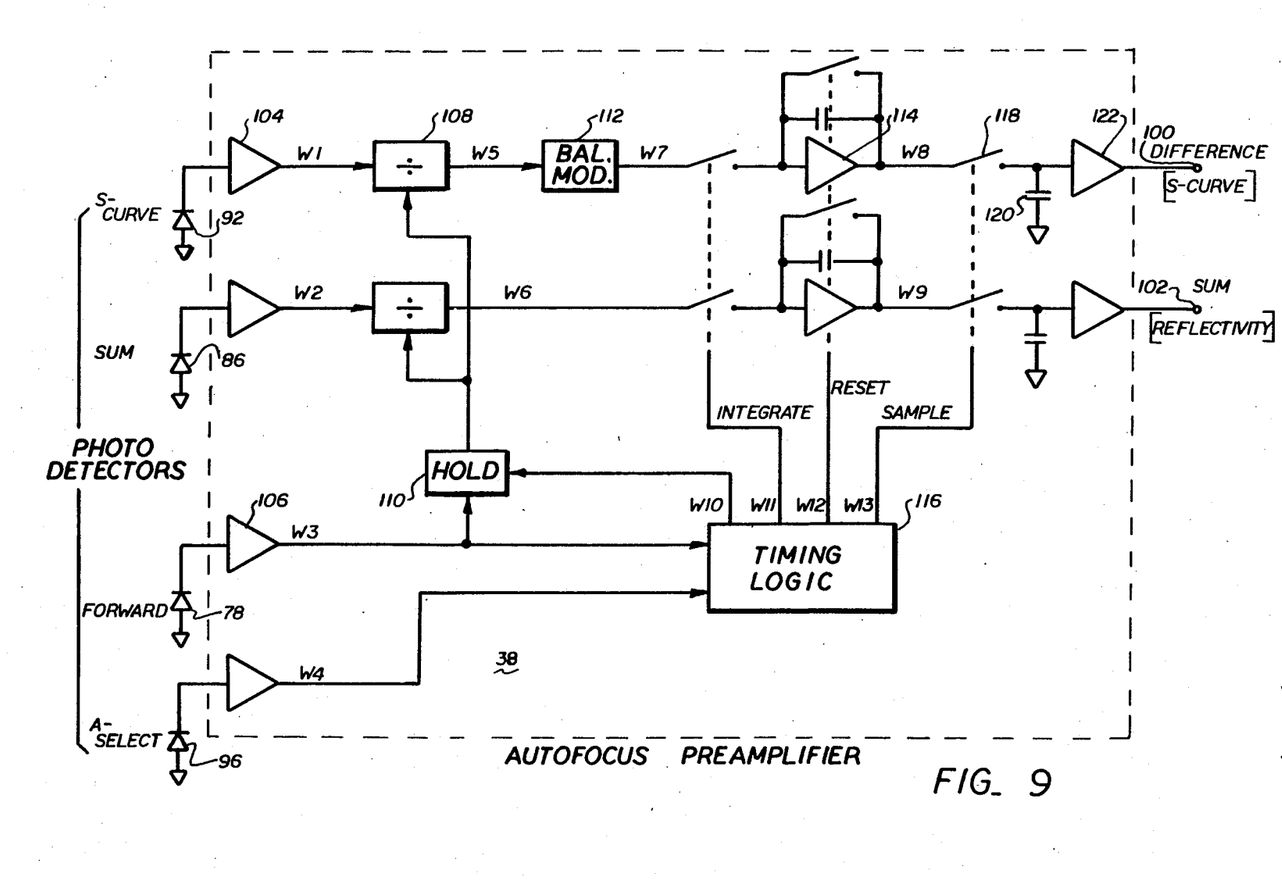
FIG. 9 is a block diagram illustrating the principal functional components of the autofocus preamplifier of the present invention.

Referring now to FIG. 9 which is a functional block diagram of the autofocus preamplifier 38, it will be understood that the preamplifier 38 processes the outputs of the focus (S-CURVE) detector 92 and SUM detector 86, and from these signals generates at the output terminals 100 and 102 DIFFERENCE (S-CURVE) and SUM (REFLECTIVITY) outputs respectively, for input to the autofocus controller 36 shown in FIG. 1. The processing of the two input signals is virtually identical. The output of detector 92 consists of alternating current pulses corresponding to each of the two chopped pupils separated by gaps where both pupils are "OFF", and is input to a chopper stablized amplifier 104 configured as a current-to-voltage converter. This results in the generation of a voltage waveform W1 at the point indicated. (See also FIG. 10.)

Figure 10:
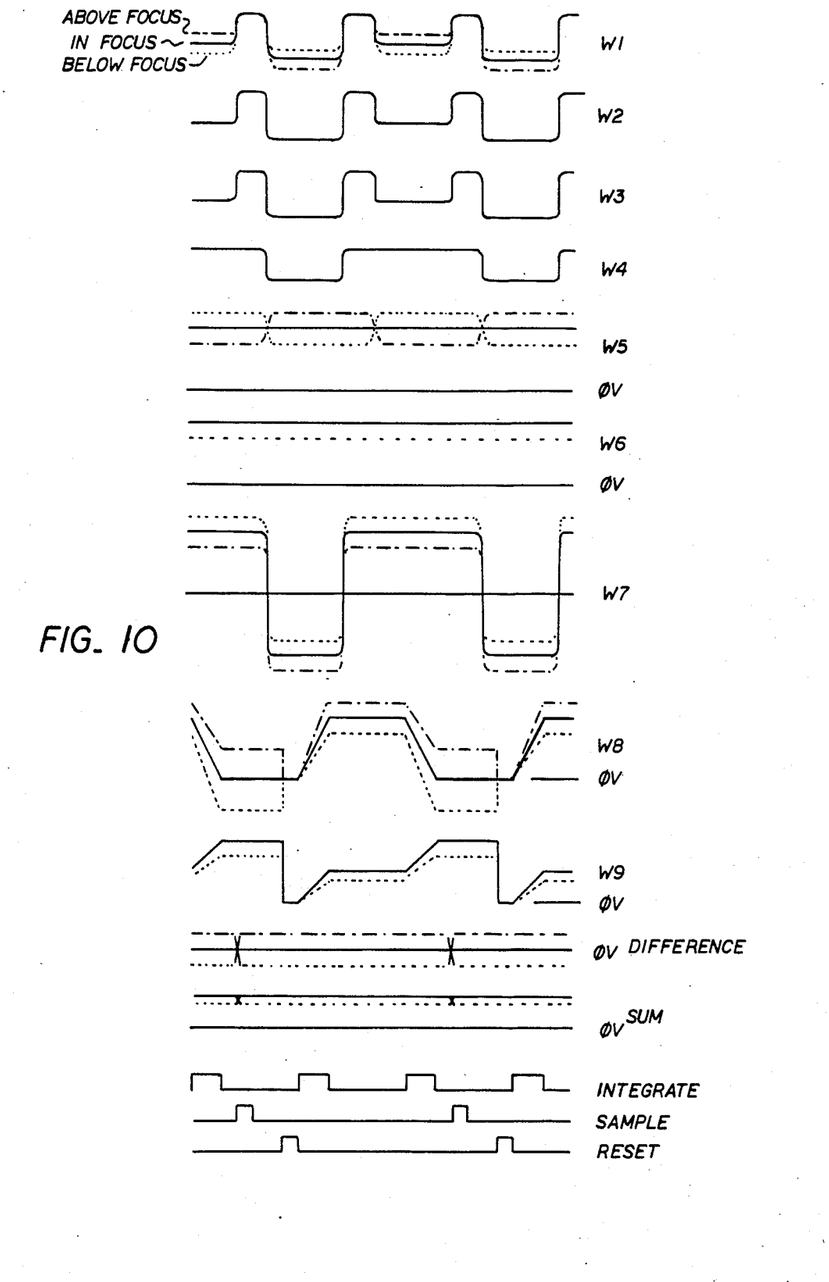
FIG. 10 shows signal waveforms at particular points in the block diagram of FIG. 9.

The basic function of the autofocus preamp is to determine the difference in level between the two time-multiplexed values of this signal. However, since the two pupils will not be perfectly balanced in intensity, the focus signal must first be normalized with respect to forward light intensity. This is achieved using the output of the forward sensor 78 which measures a small tapped-off portion of the forward path light. As indicated in FIG. 9, the output of sensor 78 is input to a current-to-voltage converter 106 to produce the waveform W3 (FIG. 10). The focus signal W1 is then divided by W3 thereby normalizing the focus return signal to forward pupil intensity.

The division is implemented by an analog divider 108, and to prevent the device from saturating when the pupils are both OFF (divisor input equals zero), a HOLD function 110 is added at the divisor input to hold the preceding channels value during the OFF period. This produces the normalized focus signal W5 as indicated in FIG. 10. It should be noted at this point that in addition to balancing the two channels, the normalization also makes the system independent of focus illuminator intensity.

The difference signal is computed for each pair of sensor inputs. A fourth sensor 96 (A-SELECT) is used to indicate which pupil is active at any instant. This sensor is buffered in the same way as the others to generate wave form W4 which, along with the forward signal W3, is used to control the timing logic for the SUM and DIFFERENCE circuitry. The normalized focus signal is passed through a balanced modulator 112 which, for the first channel of the pair, has gain equal to minus 1. The output W7 is then integrated by the integrator 114 over a period defined by the timing logic 116, and the result is held temporarily. For the second of the two channels, the modulator gain is switched to +1, and W7 is again integrated over the same period as for the first channel. The integrator output therefore ramps up for one channel and then down for the second; the net integrator output W8 after this process being a measure of the difference between the two time-multiplexed signals. This value is sampled and held by the sample and hold circuit (switch 118 and capacitor 120) and then amplified by amplifier 122 to develope the S-CURVE (DIFFERENCE) output at terminal 100. The integrator 114 is then reset and the cycle is repeated. This integrate/sample/reset process minimizes the effect of sensor and preamplifier noise.

The SUM output developed at terminal 102 is generated in an identical fashion to the S-CURVE (DIFFERENCE) output with the exception that the balanced modulator is not required since in this case the normalized signal is integrated in the same direction for both channels to generate a measure of the SUM of the individual time-multiplexed signals.

Figure 11:
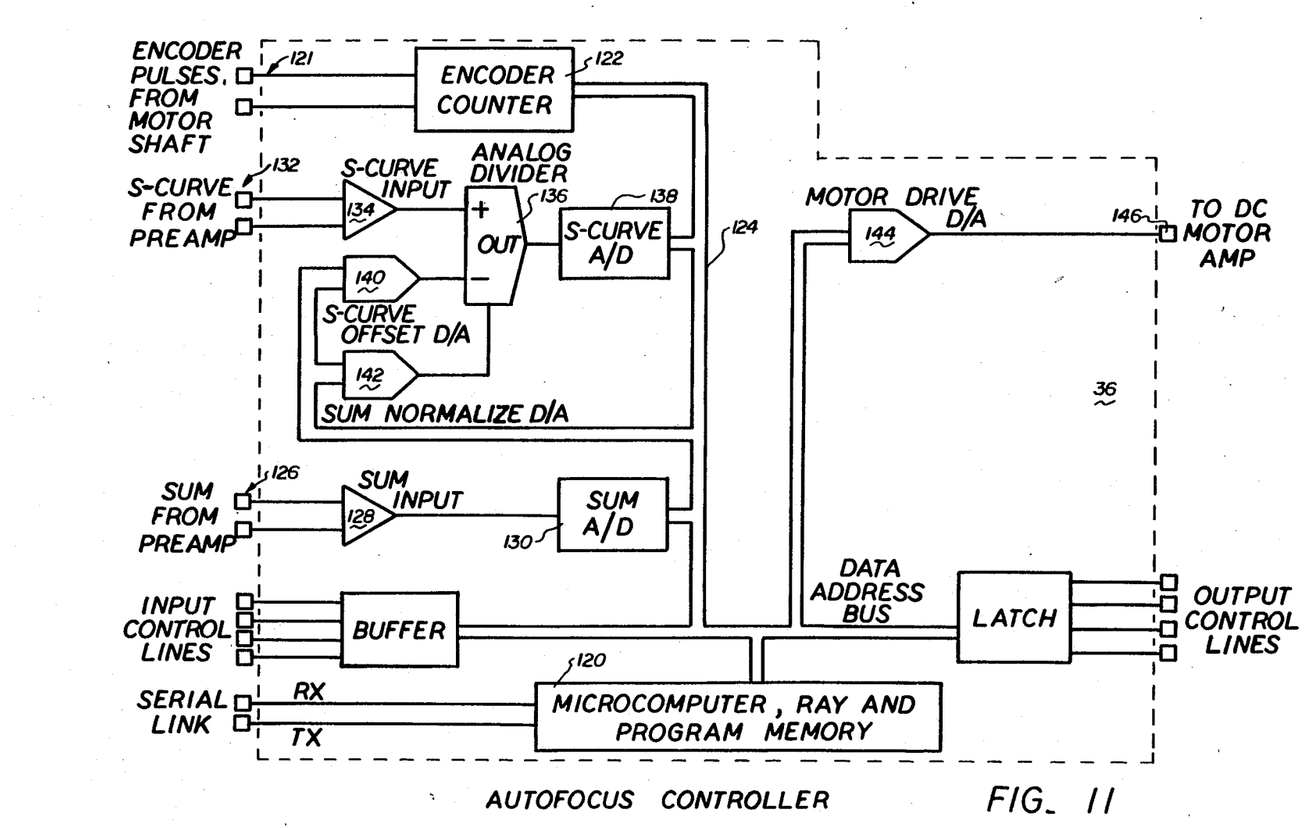
FIG. 11 is a block diagram showing the principal functional components of the autofocus controller of the present invention.

Referring now to FIG. 11 which is a block diagram schematically illustrating the principal operative components of the autofocus controller 36, it will be appreciated that controller 36 interprets the S-CURVE and SUM signals output generated by preamp 38 along with encoded position signals to cause the objective mount to be driven to the focus position. Controller 36 operations are initiated by instructions sent from a master computer (not shown) via a serial data link. The controller incorporates a single chip micro computer/micro controller 120 in addition to the other functional components illustrated in FIG. 11.

The rotation of the DC motor shaft used to drive the microscope positioning mechanism 14 is monitored by an incremental angle encoder (not shown) which delivers a two-phase set of pulses to the encoder logic 122 of the controller. This logic then presents a 16-bit absolute position count to the micro computer 120 via a data bus 124 with 2,000 counts corresponding to one rotation of the motor shaft. The shaft rotation translates, via a micrometer drive and lever arm contained in the apparatus 12 (FIG. 1), to a movement of 20 microns at the objective mount.

The SUM signal enters the controller at 126 as a differential input which is converted to single ended form by an amplifier 128, and then to an 8-bit digital form by an analog-to-digital converter 130.

The S-CURVE signal input at 132 is also converted from digital to single ended form by an amplifier 134. The signal is then input to an analog divider 136 where an S-CURVE OFFSET voltage is subtracted therefrom and the result is then divided by a sum normalization voltage. The resulting "conditioned" S-CURVE signal is thereafter converted to a 10-bit digital form by a bipolar analog-to-digital converter 138. As indicated, the S-CURVE OFFSET signal and SUM NORMALIZE signal are set by the microcomputer 120 and are converted into analog form by the digital-to-analog converters 140 and 142 respectively. The digitized SUM and S-CURVE signals developed at the outputs of converters 130 and 138 respectively, can then be read by the microcomputer 120.

Controller 36 outputs an analog MOTOR DRIVE signal at 146 via an 8-bit D/A converter 144. This signal developed is provided to a separate power amplifier and then to the DC motor which drives the objective mount 12 through the mechanical linkage previously described. The motor movement is fed back as an encoder change and/or as a change in the S-CURVE signal so that the micro computer can effect a closed loop servo control.

Figure 12:
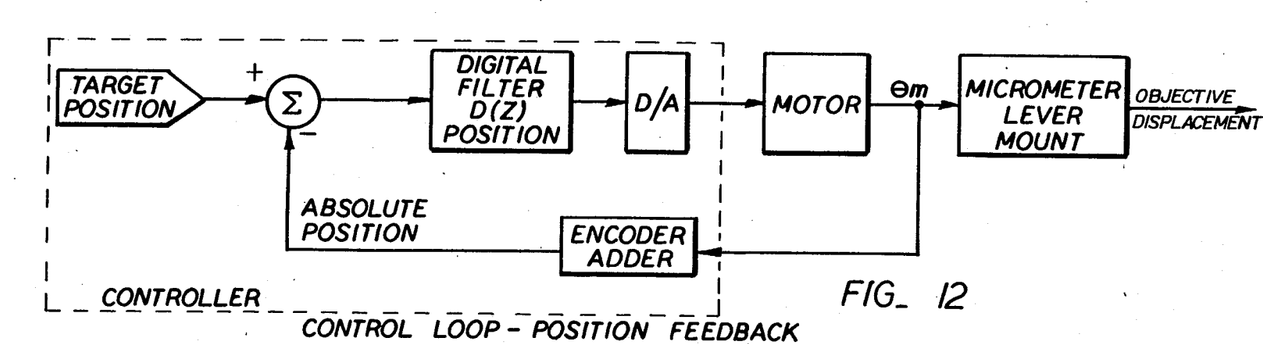
FIGS. 12 and 13 are functional block diagrams illustrating the control loops for position feedback and focus feedback respectively.
Figure 13:
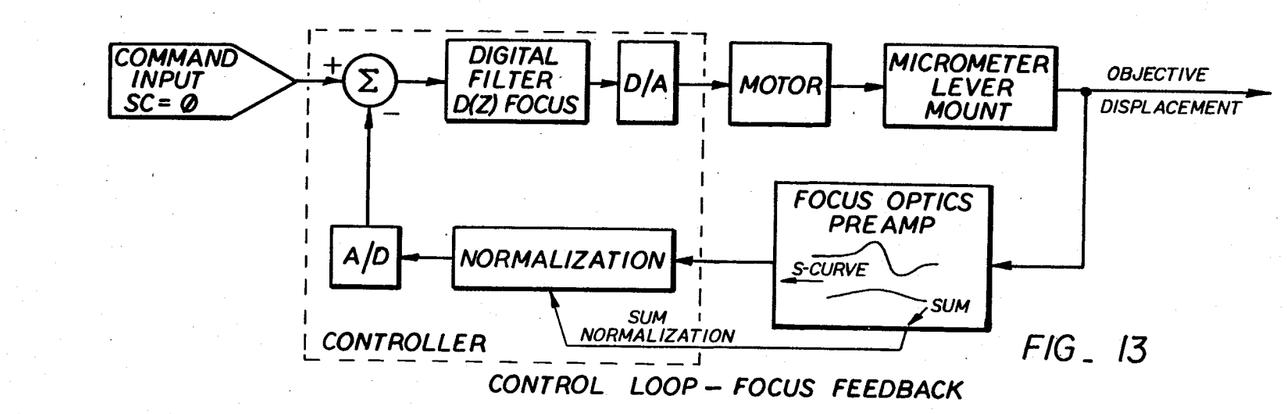

Referring now to FIGS. 12 and 13, it will be appreciated that the subject focus system employs two distinct control loops. The first diagram (FIG. 12) shows the position control loop whereby the controller monitors the encoder count and controls to a target value. Optical limit sensors (not shown) mark the upper and lower limits of lever arm travel in the apparatus 12 (FIG. 1) and the encoder count is initialized by reference to the upper limit. The micro computer implements a software second order digital filter to achieve loop stability.

The second diagram (FIG. 13) shows the S-CURVE control loop. This servo loop can only operate in the linear region of the S-CURVE. The sample curves for each objective show that the slope of the curve increases with the objective magnification. The amplitude of the curve is also proportional to the reflectivity of the wafer surface. These factors would cause wide variations in the open loop gain of the focus servo is not compensated. The micro computer thus sets a gain factor in the software digital filter which compensates for the change in slope due to the objective. Reflectivity change is normalized out by dividing the incoming S-CURVE voltage by the SUM NORMALIZE voltage. As the SUM derived signal is also proportional to wafer reflectivity, the output from the analog divider is a reflectivity/normalized S-CURVE signal.

The eventual input to the S-CURVE analog-to-digital converter is $$(\text{S-CURVE(NORM)}) = \frac{(\text{S-CURVE}) - (\text{S-CURVE(MACRO)})}{\text{SUM} - \text{SUM(MACRO)}}$$

The "macro" values are first subtracted, as they are OFFSETS arising from optical ghosts not related to the signal reflected from the wafer.

The autofocus servo loop involves additional elements compared to the position (encoder) loop and thus the compensating second order digital filter will have differently located pole and zero to give stability. It is an advantage of a software digital filter that the co-efficients can be readily changed to optimize the system configuration.

In operation, the controller 36 responds to master computer commands to move the objective mount to a desired (target) position (for example to a safe backoff height where the objective cannot interfere with the wafer) to find and lock onto a focus, or other operations required to make the focus system function along with the rest of the mechanics. Most of these operations are straight forward but the routines for "hunt-for-focus" and for maintaining focus must be described.

All controller functions occur within a repetitive timer cycle of approximately 700 micro seconds. Thus, each cycle the controller will sample the SUM and S-CURVE A/D converters, the position encoders and the input command lines. It will also output the drive signal for the D/C position control motor and update any output status lines. The timer cycle comprises the discrete-time sample period for the digital filter used in the position and focus loops.

Figure 14:
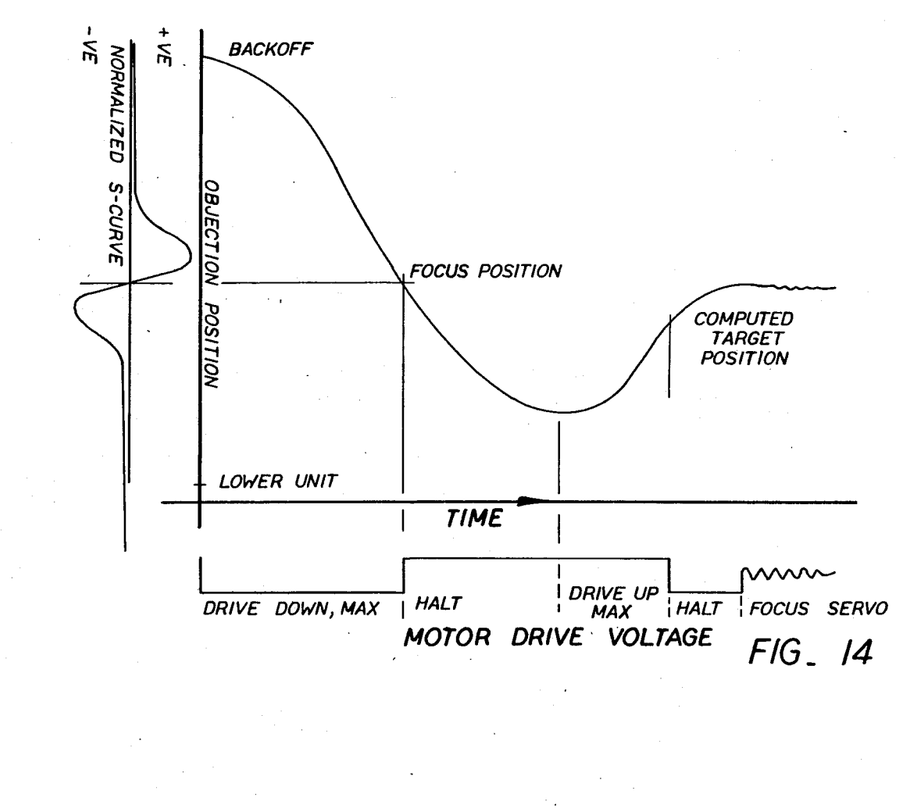
FIG. 14 is a diagram illustrating the hunt-for-focus operation of the present invention.

The operation of the hunt-for-focus routine is illustrated in the diagram of FIG. 14 wherein the vertical axis corresponds to the vertical position of the objective mount. The S-CURVE signal is also shown. The horizontal time axis also corresponds to amplitude and direction of the drive voltage. The hunt-for-focus operation starts with the objective backed off above the start of the S-CURVE. The motion of the objective mount is then plotted as a curve against these axes.

On receipt of an ENABLE FOCUS command, the controller applies the maximum drive voltage to drive the objective down toward the S-CURVE. When the controller detects the zero crossing of the S-CURVE, it logs the corresponding encoder position as the desired focus position. At the same time, it applies the maximum drive voltage in the up direction to first halt, then reverse the objective mount motion. At this point, the controller logs the halt position and computes a target position between halt and focus. The controller then drives full voltage up to the target position and finally applies a downward drive to come to a final halt at the focus. At this point, the controller exits the open loop control mode and closes the focus loop to servo on the focus position. Actually the operation is slightly more complex in order to correct for factors such as elastic stretch and relaxation of the mechanics and additional zero crossings in the S-CURVE.

When the focus loop is closed with the selected filter values, the system will servo to the zero position on the S-CURVE. However, there will be a determinate position offset between the best focus measured (in the far red) by the autofocus system and that monitored (in the visible) by the video camera. This offset is termed the chromatic offset and will be different for each objective. It is measured for each objective as a part of an initial calibration. After reaching the focus position, the controller then drives the focus to the desired chromatic offset. Further offsets can be fed in to give control of objective height relative to the S-CURVE focus. This is useful, for example, when looking at features at 100× magnification that are deeper than the depth of field.

Although a preferred embodiment of the present invention has been described above in somwhat general and schematic terms, it will be appreciated that certain alterations and modifications thereof will become apparent to those skilled in the art. It is therefore intended that the appended claims be interpreted as covering all such alterations and modifications as fall within the true spirit and scope of the invention.

What is claimed is:

1. An automatic focusing system for a microscopic optical inspection system of the type used to inspect objects such as semiconductor wafers and the like, and having an optical inspection axis extending between an inspection means and an electrically controllable microscope device, comprising:

means forming a first optical axis having a light source at one end and a first beamsplitter means at the other end, said first beamsplitter means being disposed along said optical inspection axis and operative to pass light from said first optical axis into said microscope device and to return reflected light from said microscope device back along said first optical axis;

means disposed along said first optical axis for cooperating with said light source to develop and for alternately communicating bursts of spacially separated light rays from opposite sides of said first optical axis to a pupil means disposed along said first optical axis at the conjugate image location of the back aperture of the microscope objective;

reticle means disposed along said first optical axis between said pupil means and said first beamsplitter means and having aperture means formed therein such that each said burst of light from said pupil means passes through said reticle means and casts an image of the aperture means onto the object being inspected by said microscope device;

second beamsplitter means disposed between said reticle means and said first beamsplitter means and operative to deflect returning light from said object, including said aperture means images, onto a second optical axis defined at one end by said second beamsplitter means and at the other end by an S-CURVE photodetector means, and including a first return mask disposed along said second optical axis;

third beamsplitter means disposed along said second optical axis between said second beamsplitter means and said first return mask, said third beamsplitter means reflecting a portion of said returning light along a third optical axis having said third beamsplitter means at one end and a SUM photodetector means at the other end, and including a second return mask disposed therebetween; and electronic control means responsive to the output signals developed by said SUM photodetector means and said S-CURVE photodetector means and operative to generate drive signals for controlling the positioning of said microscope device relative to the object being inspected such that said microscope device focuses to a level commensurate with the average local relief of the surface area being inspected.

2. An automatic focusing system as recited in claim 1 wherein said means for alternately communicating light rays includes light chopping means and a pair of parallel fiber optics bundles having their input ends positioned proximate said light chopping means and their output ends positioned proximate said pupil means, said light chopping means being operative to alternately admit light from said light source to each of said bundles.

3. An automatic focusing system as recited in claim 2 wherein said light chopping means includes a rotatably drive wheel having a first circular array of apertures for periodically admitting said light to one of said bundles and a second circular array of apertures radially offset relative to said first array, said second array being operative to periodically admit said light to said second bundle during times when no light is admitted to said first bundle.

4. An automatic focusing system as recited in claim 1 wherein said pupil means includes means for selectively changing the diameter of the pupil aperture so that said pupil aperture is always smaller than the back aperture of the particular microscope objective in use.

5. An automatic focusing system as recited in claim 4 wherein said means for changing includes a first plate having a first pupil aperture of a first diameter and a second plate selectively positionable in contiguous relationship with said first plate and having a second pupil aperture with a second diameter smaller than said first diameter.

6. An automatic focusing system as recited in claim 1 wherein the aperture means of said reticle means includes at least one elongated aperture the width of which causes an image to be projected onto the object having a width that is less than the width of the field of view of the optical inspection system, and the length of which causes the length of the said image to be at least twice as long as the width of the said field of view.

7. An automatic focusing system as recited in claim 6 wherein said aperture means is formed by a plurality of parallel oriented elongated transparent portions of an opaque device.

8. An automatic focusing system as recited in claim 6 wherein said first and second return masks are configured to correspond to the image cast by said reticle means.

9. An automatic focusing system as recited in claim 1 wherein said first return mask is positioned so as to admit equal portions of said aperture means image to said S-CURVE photodetector means when said object is in focus, and less than equal portions thereof when said object is out-of-focus.

10. An automatic focusing system as recited in claim 9 wherein said second return mask is provided so as to admit the entirety of said aperture means image when said object is in focus and admits less than such entirety when the object is out-of-focus.

11. An automatic focusing system as recited in claim 1 and further comprising fourth beamsplitter means disposed along said first optical path between said reticle means and said second beamsplitter means, said fourth beamsplitter means reflecting a portion of the light passing through said reticle means along a fourth optical axis having said fourth beamsplitter means at one end and a forward light photodetector means disposed at the other end, said electronic control means being further responsive to the output signal developed by said forward light photodetector and operative to cancel any effects due to differences in the intensity or duration of said bursts of light rays.

12. An automatic focusing system as recited in claim 11 and further comprising a fourth photodetector means responsive to light corresponding to the bursts of light communicated to said pupil means on one side of said first optical axis and operative to develop a synchronizing signal for input to said electronic control means.

13. An automatic focusing system as recited in claim 1 wherein said means disposed along said first optical axis further includes means for restricting the light passed through said reticle means to that falling within a predetermined range of wavelengths.

14. An automatic focusing system as recited in claim 13 wherein said means for alternately communicating light rays includes light chopping means and a pair of fiber optics bundles having their input ends positioned proximate said light chopping means and their output ends positioned proximate said pupil means, said light chopping means being operative to alternately admit light from said light source to each of said bundles.

15. An automatic focusing system as recited in claim 14 wherein said pupil means includes means for selectively changing the diameter of the pupil aperture so that said pupil aperture is always smaller than the back aperture of the particular microscope objective in use.

16. An automatic focusing system as recited in claim 15 wherein the aperture means of said reticle means includes at least one elongated aperture the width of which causes an image to be projected onto the object having a width that is less than the width of the field of view of the optical inspection system, and the length of which causes the length of the said image to be at least twice as long as the width of the said field of view.

17. An automatic focusing system as recited in claim 16 wherein said first return mask is positioned so as to admit equal portions of said aperture means image to said S-CURVE photodetector means when said object is in focus, and less than equal portions thereof when said object is out-of-focus.

18. An automatic focusing system as recited in claim 17 wherein said second return mask is provided so as to admit the entirety of said aperture means image when said object is in focus and admits less than such entirety when the object is out-of-focus.

19. An automatic focusing system as recited in claim 18 and further comprising fourth beamsplitter means disposed along said first optical path between said reticle means and said second beamsplitter means, said fourth beamsplitter means reflecting a portion of the light passing through said reticle means along a fourth optical axis having said fourth beamsplitter means at one end and a forward light photodetector means disposed at the other end, said electronic control means being further responsive to the output sinals developed by said forward light photodetector and operative to remove any effects due to differences in the intensities or durations of said bursts of light rays.

20. An automatic focusing system as recited in claim 17 and further comprising a fourth photodetector means responsive to light corresponding to the bursts of light communicated to said pupil means on one side of said first optical axis and operative to develop a synchronizing signal for input to said electronic control means.

* * * * *